W. T. RUETE.
CLAMP.
APPLICATION FILED OCT. 28, 1913.

1,191,617.

Patented July 18, 1916.

Witnesses:

Inventor:
William T. Ruete,
by his Attorney.

UNITED STATES PATENT OFFICE.

WILLIAM T. RUETE, OF NEW YORK, N. Y., ASSIGNOR TO GENERAL ELECTRIC COMPANY, A CORPORATION OF NEW YORK.

CLAMP.

1,191,617.  Specification of Letters Patent.  Patented July 18, 1916.

Application filed October 28, 1913. Serial No. 797,884.

*To all whom it may concern:*

Be it known that I, WILLIAM T. RUETE, a citizen of the United States, residing at New York, county of New York, State of New York, have invented certain new and useful Improvements in Clamps, of which the following is a specification.

My invention relates to clamps for use in connection with pipes and the like, and it affords a convenient mode of making mechanically secure connections of good electrical conductivity with them.

I have hereinafter specifically described and illustrated the best embodiment of my invention at present known to me as adapted and applied to securing a junction box for electric wiring to a gas or other pipe. While, however, this particular device and this application of it present various special advantages, and while my invention extends even to its specific features and details, yet the invention is not confined to such specific features or details, but can be otherwise carried out and embodied, and can be adapted and extended to use in connection with various things besides junction boxes and piping.

Figure 1:
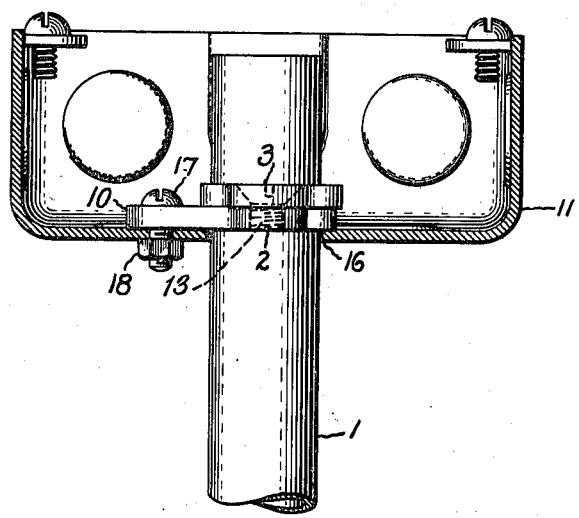
Figure 2:
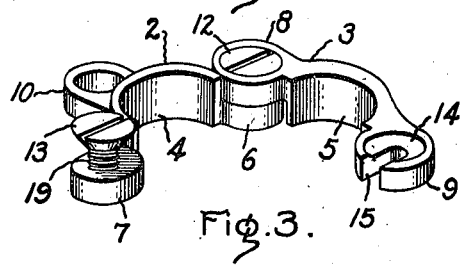
Figure 3:
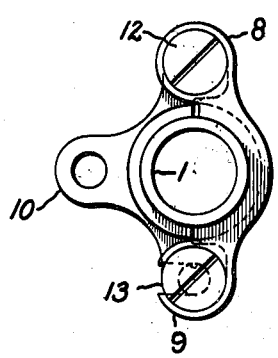

In the accompanying drawing, Figure 1 is a sectional view through a junction box of well known type showing the preferred form of clamp as employed to secure the box to a pipe, the box being in section and the pipe and the clamp in elevation. Fig. 2 is an elevational view of the clamp by itself in a slightly tilted position, the portions that grip the pipe being "opened up," so to speak. Fig. 3 is a plan view of the clamp secured about a pipe.

In the clamp illustrated in the drawings, the portions that embrace and grip the pipe 1 are made as separate parts 2 and 3, so that they can be opened up (Fig. 2) to allow the device to be easily applied in situations where it cannot be slipped over the end of the pipe 1 without disconnecting the same from other parts. In cases where this and other obvious advantages of having these portions 2 and 3 in separate parts are not considered worth while, the construction can of course be simplified in this regard. As shown, the parts 2 and 3 respectively comprise suitably formed collar portions 4 and 5 that immediately surround and directly grip the pipe 1 and pairs of lug portions 6, 7 and 8, 9 that serve for securing the parts 2 and 3 together; and the part 2 in addition comprises a lug 10 that serves for securing the clamp to the junction box 11. To permit the parts 2 and 3 to be most conveniently opened up as above described, they are pivotally connected by means of a conical headed screw 12 engaged in a threaded hole (not shown) in the lug 6 and extending loosely through a conically countersunk hole in the lug 8. The parts 2 and 3 are caused to close tight upon the pipe 1 and grip it and are afterward held together by a screw member 13 which (like the screw 12) has a conical head and moves when rotated in a direction which is the same as that of the pipe 1 but is transverse with respect to the plane of the relative movement of the parts 2 and 3 in gripping or releasing the pipe. The threads of this screw member 13 are engaged in a threaded hole in the lug 7 of the part 2, while the head portion engages in a conical countersink 14 in the lug 9, this lug 9 having a slot 15 at one side for the passage of the screw 13 when it is loosened and the parts are swung open on the screw 12, or vice-versa.

In the use of the device, the junction box 11 and the pipe 1 may be brought into the relative positions shown in Fig. 1, for example, with the pipe 1, extending through the opening 16 in the bottom of the junction box. Then the clamp may be opened as shown in Fig. 2 and placed on the pipe 1 and closed about it as shown in Figs. 2 and 3, a bolt 17 may be inserted through the hole in the lug 10 and a properly located hole in the bottom of the box 11, and a nut 18 may be screwed home on this bolt 17 so as to clamp the part 1 to the bottom of the box. Under these conditions, the ends of the screws 12 and 13 that may protrude from the lugs 6 and 8 will fall in holes (not shown) in the bottom of the box 11. Finally the screw 13 may be tightened so as to force its conical head portion against the inclined surface at the side of the countersink 14 where the slot 15 is and thus cause the gripping portions 4 and 5 of the clamp to close on the pipe 1 and grip it firmly. While the screw 12 may also be tightened to make the connection firmer and more secure, yet after the screw member 13 is once tightened its threads 19 engaging those of the lugs 7 will prevent yielding and reverse movement of said member 13, and therefore the tendency of the parts 2 and 3 to relax their grip will be neutralized by means of these threads 19 alone, since the static friction of the threads 19 with those of the lug 8 will keep the member 13 from unscrewing.

The order of operation in applying the clamp can of course be changed to suit the convenience of the workman and the conditions of the particular case; but it is obviously unnecessary to describe the many possible variations.

From the foregoing description it will be apparent that the clamp shown is simple, strong, and rugged, and that it can be applied with a minimum of trouble so as to make a firm mechanical connection of good electrical conductivity. It will further be seen that the arrangement of the screw member 13 is such that there is no difficulty in getting at it with a screw-driver to tighten it, so that one common source of trouble and annoyance heretofore met with in the use of ground clamps in junction boxes is entirely done away with. Moreover, the inclination of the co-acting surfaces of engagement of the head of the screw member 13 and the lug 9 of the part 3 with reference to the axis of the screw and the direction of the movement of the parts 2 and 3 in gripping the pipe 1 or releasing it can be made such that the grip of the clamp will be exceedingly strong.

What I claim as new and desire to secure by Letters Patent of the United States, is:—

1. A clamp comprising opposed portions suitably formed for gripping the part to be clamped and a member adapted to engage with both said portions and movable in a direction transverse with reference to their relative movement in gripping or releasing said part, one of the coacting surfaces of engagement of said member and one of said clamp portions being inclined with reference to the direction of relative movement of said clamp portions in gripping and releasing in such wise as to cause them to close upon said part and grip it when said member is moved one way, there being means in engagement with one of said clamp portions whereby reverse movement of said member as a result of the tendency of the parts to relax their grip is normally prevented.

2. A clamp comprising opposed portions suitably formed for gripping the part to be clamped and a member having a screw portion in engagement with one of them and also having a portion adapted to engage a surface on the other which is inclined with reference to the axial direction of the screw and to the direction of their relative movement in gripping or releasing said part to be clamped, so that when said member is rotated in one direction it will cause the parts to close upon the part to be clamped and grip it.

3. A clamp comprising opposed portions suitably formed for gripping the part to be clamped and a member having a screw portion engaging with threads in one of said clamp portions and a head portion adapted to engage with an inclined surface on the other, the direction of motion of said member when rotated being transverse to the plane of the relative movement of said portions in gripping or releasing said part to be clamped, so that when it is rotated in one direction it will cause them to close upon said part to be clamped and grip it, and when it is rotated in the opposite direction it will permit them to separate and release said part.

4. A clamp comprising two parts suitably formed for gripping the part to be clamped and pivoted together so as to be capable of swinging toward and away from one another and having portions which overlap when the parts are swung together, and a headed screw member for securing together said overlapping portions, one of said overlapping portions having in it a threaded hole in which the screw member is engaged extending in the same direction as the pivotal axis of the parts, and the other of said overlapping portions having a slot for the passage of said screw member when the parts are swung together and an inclined surface for engaging the head of said member when said member is subsequently screwed farther into said hole, the engagement of said head with the inclined surface aforesaid when said screw is thus screwed into the hole acting to cause the parts to close upon the part to be clamped and grip it.

5. A clamp comprising two parts having collar portions adapted to surround and grip the part to be clamped and pairs of overlapping lugs, two of the overlapping lugs of said parts being secured together so that the parts may be opened up to admit the part to be clamped and subsequently brought together to grip it, and a screw member for securing the other two overlapping lugs together which has a conical head, one of the last-mentioned overlapping lugs having in it a threaded hole in which said screw member is engaged extending in the same direction as the part to be clamped and the other of said latter lugs having a slot for the passage of said screw member when the parts are brought together and a conical countersink for receiving the head of said member when said member is subsequently screwed farther into said hole, the engagement of said conical head with the surface of said countersink when said screw is thus screwed into the hole acting to cause the parts to close upon said part to be clamped and grip it.

In witness whereof, I have hereunto set my hand this 25th day of October 1913.

WILLIAM T. RUETE.

Witnesses:
   H. T. COSGROVE,
   J. F. McGUIRE.